US012421989B2

(12) United States Patent
Badrenas

(10) Patent No.: US 12,421,989 B2
(45) Date of Patent: Sep. 23, 2025

(54) SUPPORT CLIP FOR ELONGATED COMPONENT(S)

(71) Applicant: Illinois Tool Works Inc., Glenview, IL (US)

(72) Inventor: Jordi Badrenas, Granollers (ES)

(73) Assignee: Illinois Tool Works Inc., Glenview, IL (US)

( * ) Notice: Subject to any disclaimer, the term of this patent is extended or adjusted under 35 U.S.C. 154(b) by 67 days.

(21) Appl. No.: 18/384,098

(22) Filed: Oct. 26, 2023

(65) Prior Publication Data

US 2024/0141936 A1 May 2, 2024

(30) Foreign Application Priority Data

Oct. 27, 2022 (EP) .................................... 22383037

(51) Int. Cl.
*F16B 7/04* (2006.01)
*B60R 16/02* (2006.01)
*B60R 16/08* (2006.01)

(52) U.S. Cl.
CPC ........ F16B 7/0433 (2013.01); *B60R 16/0215* (2013.01); *B60R 16/08* (2013.01)

(58) Field of Classification Search
CPC ...... F16B 7/0433; F16B 2/22; B60R 16/0215; B60R 16/08; H02G 3/04; H02G 3/24; H02G 3/26; H02G 3/28; F16L 3/22; F16L 3/237

(Continued)

(56) References Cited

U.S. PATENT DOCUMENTS 4,358,080 A * 11/1982 Wolker .................. F16B 39/30
24/339
4,450,605 A * 5/1984 Schaty ...................... F16L 3/13
24/457

(Continued)

FOREIGN PATENT DOCUMENTS

DE 102004020455 11/2005
DE 102006031729 1/2008

OTHER PUBLICATIONS

The extended European search report for Application No. 22383037.3, dated Mar. 27, 2023, European Patent Office, Germany (8 pages).

*Primary Examiner* — Christopher Garft
(74) *Attorney, Agent, or Firm* — McAndrews, Held & Malloy, Ltd.

(57) ABSTRACT

Disclosed is a support clip for two or more tubular components. The support clip having a first resilient outer frame member and at least one second resilient outer frame member. The first resilient outer frame member is coupled to a central support member that is adapted to resiliently engage an opposing surface of at least one external structure. The at least one second resilient outer frame member is coupled to the central support member opposite the first resilient outer frame member. First and second lateral frame portions are arranged laterally opposite each other about the central support member and adapted to resiliently engage an opposing surface of the at least one external structure. A first open-ended sleeve member and a second open-ended sleeve member are arranged between the first resilient outer frame member and a respective one of the first and second lateral frame portion. A first end portion is connected to the first resilient outer frame member and a second end portion is connected to a respective one of the first and second lateral frame portion. The first resilient outer frame member is adapted to resiliently urge the first end portion of each of the (Continued)

first and second open-ended sleeve members towards the second end portion upon engagement between the first resilient outer frame member and the at least one external structure.

20 Claims, 7 Drawing Sheets

(58) Field of Classification Search
USPC .......................................................... 248/74.2
See application file for complete search history.

(56) References Cited

U.S. PATENT DOCUMENTS

| | | | | |
|---|---|---|---|---|
| 4,550,891 | A * | 11/1985 | Schaty | F16B 37/0842 |
| | | | | 24/339 |
| 5,190,251 | A * | 3/1993 | Bodo | F16L 3/237 |
| | | | | 248/68.1 |
| 5,464,179 | A * | 11/1995 | Ruckwardt | F16L 3/237 |
| | | | | 248/68.1 |
| 6,443,404 | B1 * | 9/2002 | Montagano | F16L 3/13 |
| | | | | 248/74.5 |
| 2009/0026673 | A1 * | 1/2009 | Clark | F16L 3/13 |
| | | | | 267/140.11 |
| 2014/0159289 | A1 * | 6/2014 | Loewe | B60R 16/0215 |
| | | | | 267/140.11 |
| 2022/0102951 | A1 | 3/2022 | Badrenas | |

* cited by examiner (a)

(b)

SUPPORT CLIP FOR ELONGATED COMPONENT(S)

RELATED APPLICATION

The present application claims the benefit of European Patent Application No. 22383037.3, filed Oct. 27, 2022, titled "A Support Clip for Elongated Component(s)," the contents of which are hereby incorporated by reference.

TECHNICAL FIELD

The present disclosure relates to a support clip for two or more elongate structures such as tubing, piping, cables, conduits and the like, and in particular, to an adaptively self-locking resilient clip configured to reduce the effect of any external forces onto the coupling between the support clip and the elongate structures.

BACKGROUND

In the manufacture of vehicles, many different elongates components, such as, tubular lines, conduits, pipes, cables and the like are widely used to interconnect various vehicle parts within the vehicle body and engine compartment. Here, the elongate components may be secured to portions of the vehicle structure utilizing, for example, routing clips, cable clamps or any other suitable fastener. Clips or clamps of this type are particularly useful for fastening brake lines, or electric cables or flexible fluid conduits to automobile bodies. However, large sections of such elongate components (e.g. cables or flexible conduits) may cross free space within the vehicle body or engine compartment and are therefore subjected to vehicle movement and/or vibrations generated by the engine during use of the vehicle.

Consequently, many of these free-hanging sections of elongate components may be positioned in a fixed relative arrangement between a plurality of elongate components (e.g. cables or flexible conduits) using spacer clips. In addition, such spacer clips or so called spring clips may be coupled separately to individual elongate components, as well as, a plurality of elongate components (in addition to the spacer function) in order to provide a "buffer" or shock absorber when the free-hanging sections of the cables, flexible conduits or any other tubular lines are severely flung around within the vehicle body or engine compartment and possibly and unintentionally make contact with surrounding structures, potentially causing damage to the elongate components and/or displace or even dislodge the spacer member from the elongate component(s).

An object of the disclosure to provide an improved support clip and/or spacer clip where the risk of slipping on the elongate component(s) or even moving out of engagement with the elongate component(s) is minimized.

SUMMARY

The present disclosure relates generally to a support clip and/or spacer clip, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
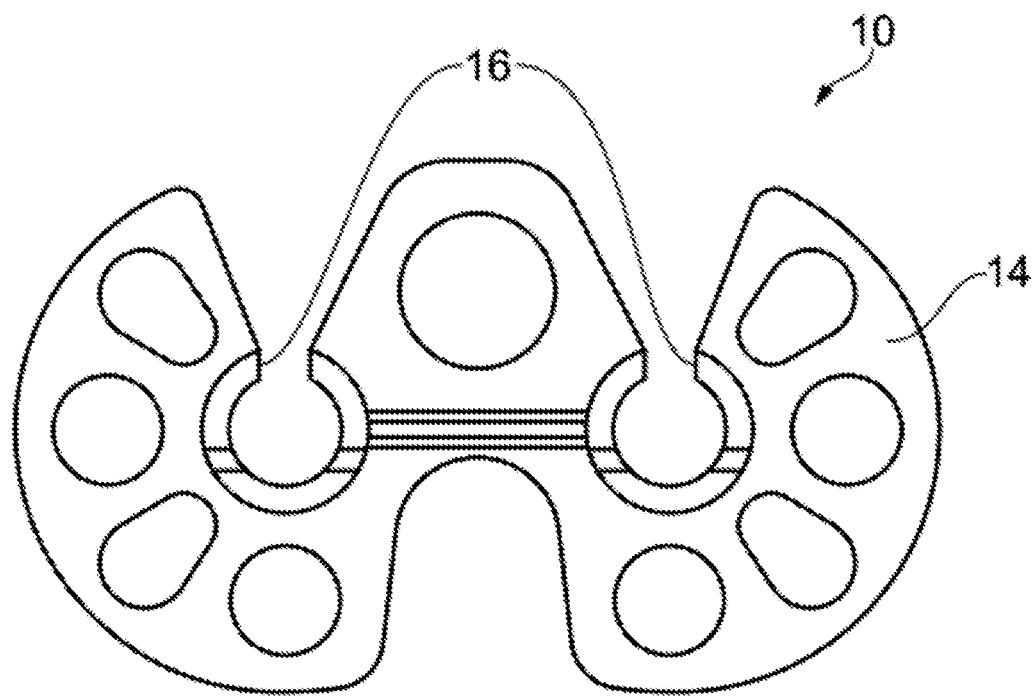
FIG. 1 shows an example of a spacer clip known in the prior art (a) in front view, and (b) in perspective view when coupled to two tubular lines.
Figure 1:
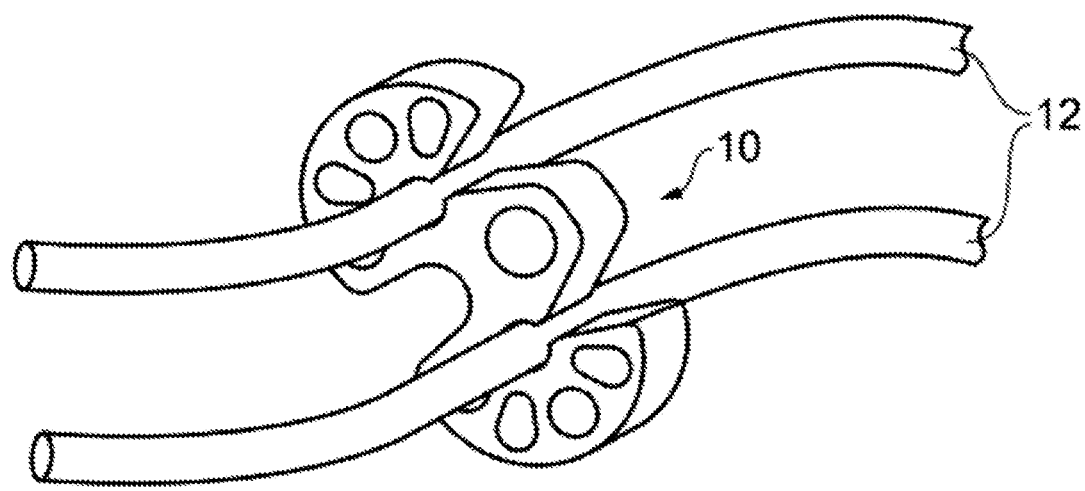

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein.

Certain terminology is used in the following description for convenience only and is not limiting. The words 'upper' and 'lower' and designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, relative positional terms, such as, 'distal', 'proximal', 'lateral' and 'medial' are understood in their normal meaning and in relation to a specific element being described. In particular, these terms designate directions in relation to the tool or user end, e.g. proximal is in a direction towards the installation tool or user, wherein distal refers to the direction away from the installation tool or user.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Further, the terms 'spacer clip', 'support clip', 'spring clip' are used interchangeably and include any clip or clamp member configured to removably mount onto at least one elongate component (e.g. tubular component, such as a cable or conduit) to provide at least a shock absorber to external impact, as well as, a spacer when used with two or more elongate components.

Like reference numerals are used to depict like features throughout.

In one aspect of the disclosure, there is provided a support clip for two or more tubular components, having: a first resilient outer frame member coupled to a central support member, adapted to resiliently engage an opposing surface of at least one external structure; at least one second resilient outer frame member coupled to said central support member opposite said first resilient outer frame member, having a first and second lateral frame portion arranged laterally opposite each other about said central support member, adapted to resiliently engage an opposing surface of the at least one external structure; a first open-ended sleeve member and a second open-ended sleeve member, each one arranged between said first resilient outer frame member and a respective one of said first and second lateral frame portions and comprising a first end portion, connected to said first outer frame member, and a second end portion, connected to a respective one of said first and second lateral frame portion, said second end portion is circumferentially spaced apart from said first end portion about a respective one of said first and second open-ended sleeve member; a first and second spring member, each one operably coupled between said second end portion of a respective one of said first and second open-ended sleeve member and a respective one of said first and second lateral frame portions, adapted to resiliently urge said second end portion towards said first end portion upon engagement between said first and second lateral portions and the at least one external structure, and wherein said first outer frame member is adapted to resiliently urge said first end portion of each of said first and second open-ended sleeve members towards said second end portion upon engagement between said first outer frame member and the at least one external structure.

This provides the advantage that energy transmitted from impact or engagement of the support clip with external structures (e.g. from vehicle movement or vibrations of the engine) is controllably directed via the first resilient outer frame portion and first and second lateral frame portions onto a respective end portion of the open-ended sleeve member, so as to move at least one of the end portions of the open-ended sleeve member towards its closed position (i.e. towards the other end portion of the open-ended sleeve member), therefore, increasing the clamping force of the sleeve member onto the tubular structure and "tightening the grip" on the tubular structure retained within the sleeve member. As such, the support clip is able to adapt (i.e. increase) its "grip" onto the tubular component when subjected to external forces caused, for example, by the impact of the upper and lower outer frame members of the support clip with external structure(s) and therefore ensures a secure fixation with the one or more tubular components. Furthermore, the closed first resilient frame member prevents pipes from moving into the wrong position during assembly, while promoting funneling of the engages pipes into their respective sleeves.

Advantageously, a distal portion of said first end portion may project towards said central support member at an angle substantially perpendicular to send first end portion.

Preferably, said first outer frame member may be configured so as to convey resilient energy, provided from resilient engagement between any portion of said first outer frame member and the at least one external structure, to said first end portion of at least one of said first and second open-ended sleeve members, so as to resiliently urge said distal portion of said first end portion towards said central support member and apply a retaining force to the at least one of the two or more tubular components. This provides the advantage that the distal end portion applies a retaining force to the at least one of the two or more tubular components to restrict axial movement of the tubular components.

Advantageously, said first end portion of each of said first and second open-ended sleeve members may form a fulcrum with said first outer frame member adapted to permit rotation of said first end portion to resiliently urge said distal end portion towards said central support member. This provides the advantage that the fulcrum creates a lever action to translate the force applied to the first outer member to the retaining force applied to the at least one of the two or more tubular components. This lever action magnifies the force to increase the retaining force applied to the at least one of the two or more tubular components.

Preferably, said arcuate spring element may be formed from a thinned portion of material.

Advantageously, each one of said first and second spring members may be operably coupling said second end portion of a respective one of said first and second sleeve member with a respective one of said first and second lateral portions. Preferably, each of said second end portions may be operably coupled with a respective one of said first and second lateral portions via one of said first spring member or said second spring member.

Alternatively and advantageously, each of said first and second spring members may be operably integrated within a portion of a respective one of said first and second lateral portions that is coupled to said second end portion of a respective one of said first and second sleeve members.

Advantageously, said first outer frame member, said at least one second outer frame member, said central portion, said first and second open-ended sleeve members, and said first and second spring members may be integral component parts. Preferably, said first outer frame member, said at least one second outer frame member, said central portion, said first and second open-ended sleeve members, and said first and second spring members may be integrally moulded from a resilient material. Preferably, said resilient material is may be any one of a polymer, a metal, or a compound or combination thereof.

Advantageously, said first spring member and/or said second spring member may comprise an arcuate portion. Preferably, said first spring member and/or said second spring member may be provided by a U-shaped spring element. Alternatively, said first spring member and/or said second spring member may be provided by an S-shaped spring element.

Advantageously, said first open-ended sleeve member and said second open-ended sleeve member may be arranged in parallel to and spaced apart from one another about said central portion.

Advantageously, said at least one second outer frame member may be configured so as to convey resilient energy, provided from resilient engagement between any portion of said at least one second outer frame member and the at least one external structure, to at least one of said first and second spring members so as to resiliently urge said second end portion of at least one of said first and second open-ended sleeve members towards said first end portion.

Advantageously, each of said first and second spring members and said first outer frame member may converge towards an opening of a respective one of said first and second sleeve members between said first and second end portions, so as to provide guide for insertion of each of the two or more tubular components. This provides an advantage in that the guide reduces the insertion force of the tubular component when inserting the tubular component into the sleeve.

Preferably, an angle between each of said first and second spring members and said first outer frame member may be from 30 degrees to 120 degrees. More preferably, the angle between each of said first and second spring members and said first outer frame member may be from 45 degrees and 90 degrees. Most preferably the angle between each of said first and second spring members and said first outer frame member may be from 60 degrees to 90 degrees.

Advantageously, at least one of said first outer frame member and said at least one second outer frame member may be continuous. This provides the advantage of only providing two openings in the support clip so that the tubular component cannot be wrongly assembled.

Referring now to FIG. 1, a typical spacer member 10 is shown (a) in front view and (b) in situ when connected to two tubular lines 12. Such a shock absorbing spacer clip 10 generally comprises a soft material 14, such as, for example, a soft silicone polymer material or a polymeric foam or sponge material, that is adapted to absorb compressive forces (i.e. compressive forces from impact with external structures due to vehicle movement or vibrations). Simple clamp members 16 are operably encased by the soft polymer material 14, so as to provide a shock absorbing buffer zone. Further, the clamp members 16 are configured to receive the one or more elongate components 10.

However, in currently available spring clips or spacer clips, external impact forces may be transmitted directly and uncontrolled to the clamp member(s) so that there is a real risk that the clamp member is loosened and/or sufficiently opened for the clip to be displaced on or even knocked out of engagement with the one or more elongate components. As a result, additional effort and costs may be incurred, because spring clips or spacer clips, as well as, potentially damaged elongate components and/or vehicle parts may have to be restored or replaced.

Figure 2:
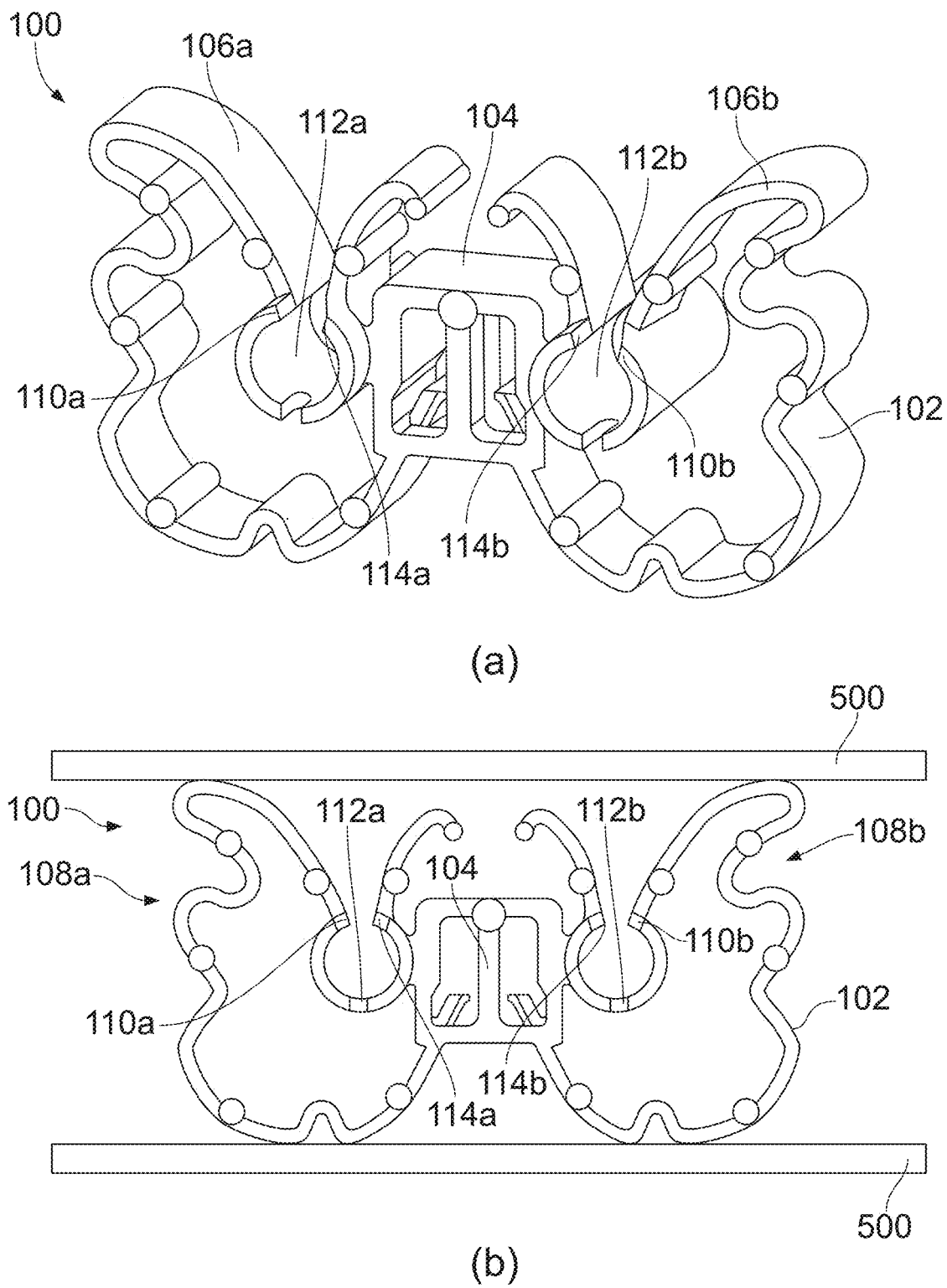
FIG. 2 shows another example of a prior art support clip (a) in perspective view and (b) in front view when assembled between a first surface and a second surface.

Referring now to FIG. 2, another known support clip 100 that is suitable for two elongate components (i.e. pipes or fluid conduits) is shown (a) in perspective view and (b) in situ between a first surface 500 and a second surface 510 (without pipes). The support clip comprises an outer frame 102 extending symmetrically laterally outwards from a bottom portion of a central rib member 104, so as to form a loop back towards a top portion of the central rib member 104. Each one of a distal end portion 106a, 106b of the symmetrical outer frame 102 integrally joins into an S-shaped spring element 108a, 108b that integrally couples to a first end portion 110a, 110b of a suspended open-ended sleeve 112a, 112b. A second end portion 114a, 114b extends into an end portion 116a, 116b of the outer frame 102. The spring element 108a, 108b is oriented between the first end portion 110a, 110b of the open-ended sleeve 112a, 112b and the distal end portion 106a, 106b of the outer frame 102 in such a way that energy transmitted via the spring element 108a, 108b pushes or urges the first end portion 110a, 110b of the open-ended sleeve 112a, 112b towards its closed position, i.e. towards the second end portion 114a, 114b of the open-ended sleeve 112a, 112b.

However, the elongate components are free to move and vibrate within the sleeve and free to move axially through the sleeve. This can potentially damage the elongate components. Further, open end portions, such as those shown in FIG. 2, may provoke pipes to be wrongly positioned, e.g. onto the central rib member 104, or weaken the clipping force onto correctly inserted pipe section, during use. It is therefore an object of the disclosure to provide an improved support clip and/or spacer clip where the risk of slipping on the elongate component(s) or even moving out of engagement with the elongate component(s) is minimized.

Figure 3:
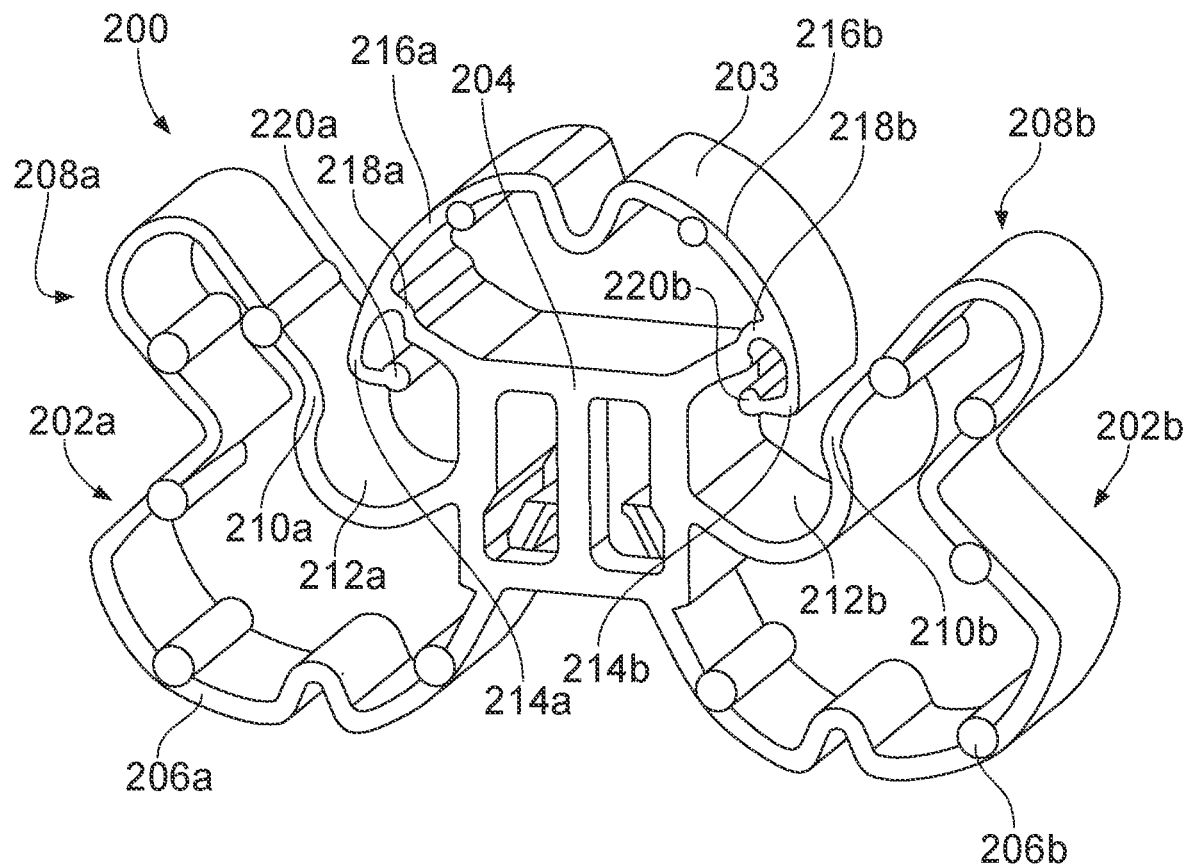
FIG. 3 shows a support clip of the present disclosure in a perspective front right-side view.

Referring now to FIG. 3, there is shown a support clip 200 of the present disclosure that is suitable for two elongate components (as spacer and "buffer"). The support clip 200 has a lower outer frame members 202, having two lateral frame portions 206a, 206b extending symmetrically laterally outwards from a bottom portion of a central support member 204 or central rib member, so as to form a loop back towards a middle portion of a side surface of the central support member 204. Each one of the lateral frame portions 206a, 206b integrally couples to the central support member 204 at one end, and integrally joins into a respective spring element 208a, 208b towards the other end. The spring element 208a, 208b then integrally joins to a first end portion 210a, 210b of an embedded open-ended sleeve 212a, 212b that is provided between respective spring element 208a, 208b and side surface of the central support member 204.

An upper outer frame member 203 extends from and forms an integral loop with a top portion (or top surface) of the central support member 204. Further, each one of respective open-ended sleeves 212a, 212b is integrally and operably formed between a lateral portion of the upper outer frame member 203, the side surface of the central support member or rib 204 and the spring element 208a, 208b.

A second end portion 214a, 214b of the open-ended sleeves 212a, 212b is operably coupled to a respective lateral portion the upper outer frame member 203 via an integrally formed arcuate spring element 218a, 218b. Each one of the integrally formed arcuate spring elements 218a, 218b is configured to provide a fulcrum for the integrally linked second end portion 214a, 214b and a respective upwardly extending lateral wall portion 216a, 216b of the upper outer frame member 203. In particular, the acuate spring element 218a, 218b is configured to translate displacement of the lateral wall portion 216a, 216b (e.g. from compressing or deforming the upper outer frame member 203 when engaging with an external structure) into a fulcrumed lever movement of the second end portion 214a, 214b. For example, when the upper outer frame member 203 is deformed by an external force, the lateral wall portion 216a, 216b is pushed down about the acuate spring element 218a, 218b and the second end portion 214a, 214b is "levered" up about the arcuate spring element 218a, 218b (i.e. away from the central support member 204).

The open-ended sleeve 212a, 212b further comprises a distal lever portion 220a, 220b arranged substantially perpendicular to the second end portion 214a, 214b of the sleeves 212a, 212b and extending into the open-ended sleeve 212a, 212b (i.e. towards the central support member 204).

Figure 7:
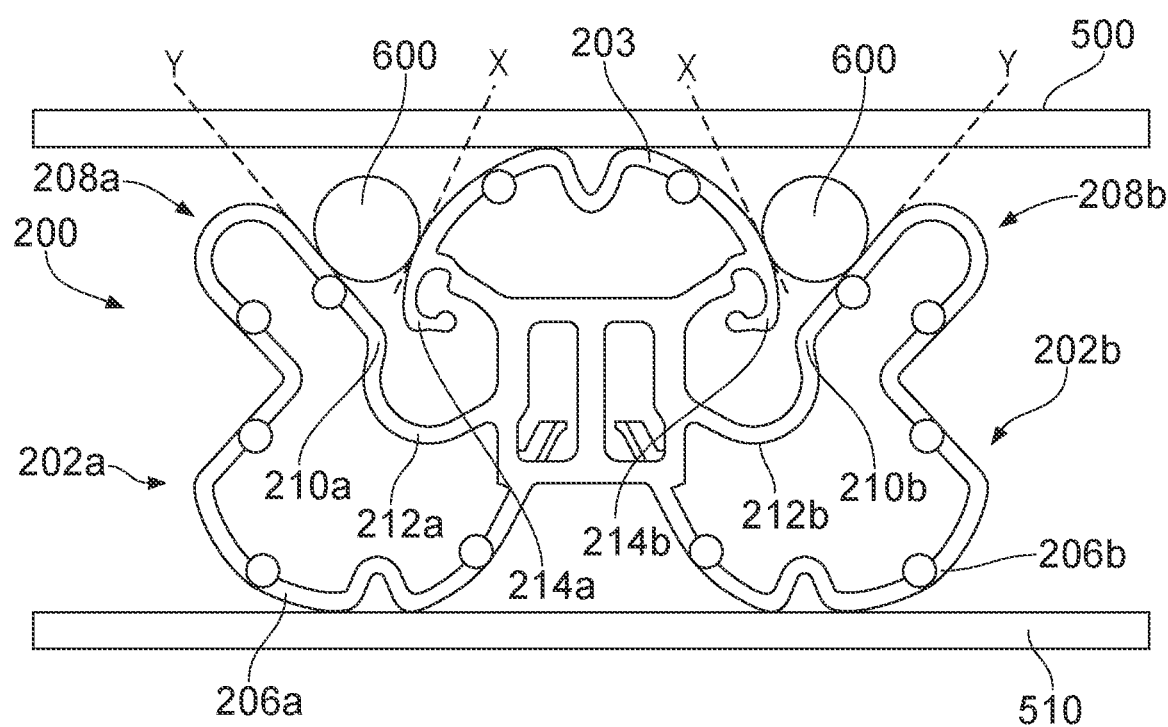
FIG. 7 shows the support clip of FIG. 1 in front view during insertion of tubular elements.

As shown in particular in FIG. 7, the upper outer frame member 203 and respective spring elements 208a, 208b are shaped and arranged so as to slope or curve towards the openings of the open-ended sleeve members 212a, 212b and guidingly engage with the tubular(s) 600 when moved towards and into the opening of the open-ended sleeve members 212a, 212b during assembly. Lines 'X' and 'Y' illustrate the funnel created by the converging outer surfaces of the upper outer frame member 203 and the spring member 208a, 208b of respective lateral frame portions 206a, 206b of the lower outer frame member 202.

Figure 6:
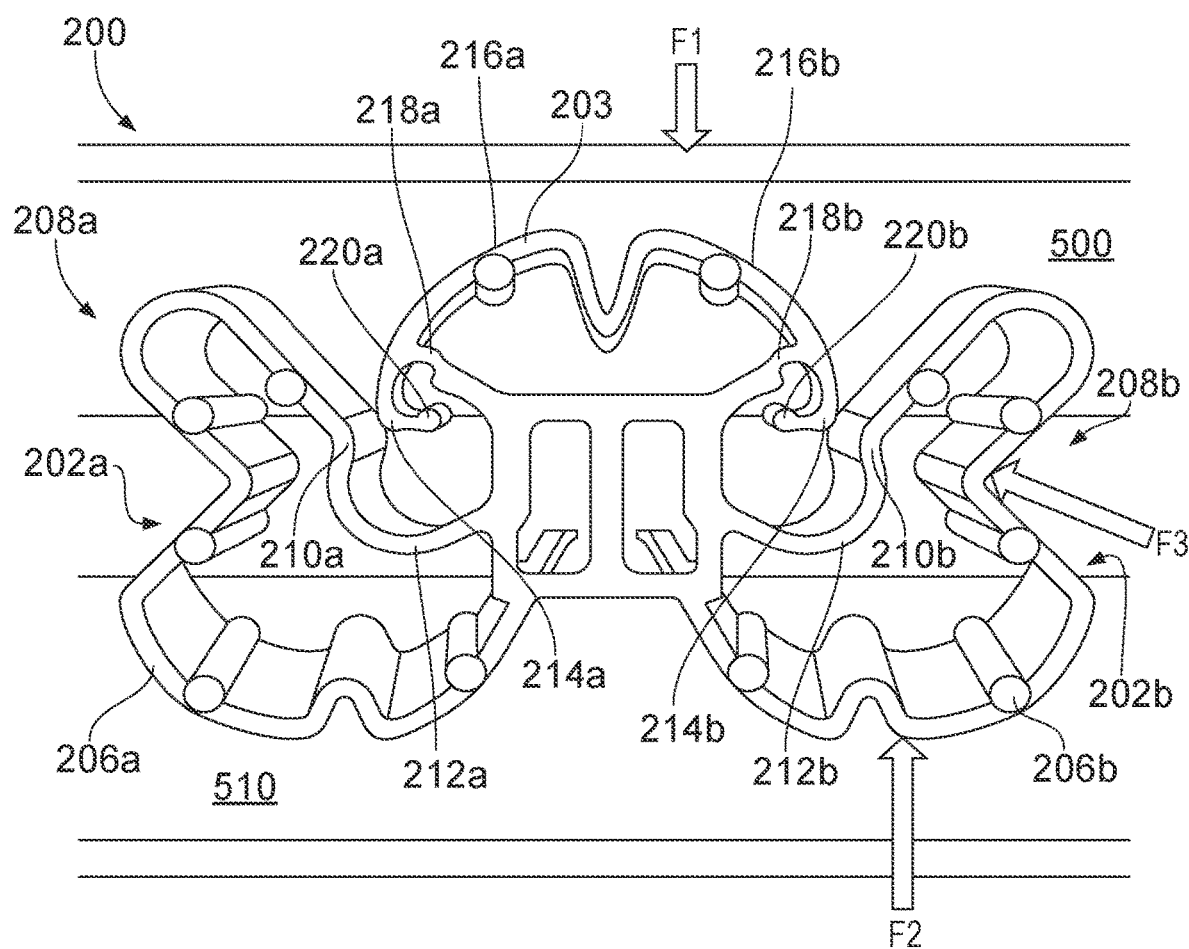
FIG. 6 shows the support clip of FIG. 1 in perspective view under compression from an external top and bottom structure.

The spring elements 208a, 208b may have any shape suitable to resiliently transmit external forces (e.g. from impact) onto the first end portion 210a, 210b of the open-ended sleeve 212a, 212b, and is oriented between the first end portion 210a, 210b of the open-ended sleeve 212a, 212b and the two lateral frame portions 206a, 206b in such a way that energy transmitted via the spring element 208a, 208b pushes or urges the first end portion 210a, 210b of the open-ended sleeve 212a, 212b towards its closed position, i.e. towards the second end portion 214a, 214b of the open-ended sleeve 212a, 212b. In the example embodiment of the present disclosure, the spring element 208a, 208b is U-shaped joint to a 'corner' of the lateral frame portion 206a, 206b. However, the spring element 208a, 208b may have any suitable shape adapted to translate deformation of the upper and lower outer frame members 203, 202 into a resilient flexure of the first end portion 210a, 210b of the open-ended sleeve 212a, 212b (e.g. S-shape), such that energy transmitted via the spring element 208a, 208b pushes or urges the first end portion 210a, 210b of the open-ended sleeve 212a, 212b towards its closed position, i.e. towards the second end portion 214a, 214b of the open-ended sleeve 212a, 212b. FIG. 6 shows the spring element 208a, 208b, in situ, when under pressure from the external structure(s) 500, 510 with arrows indicating the movement of particular sections of the lower outer frame member 202 and the upper outer frame member 203.

Figure 4:
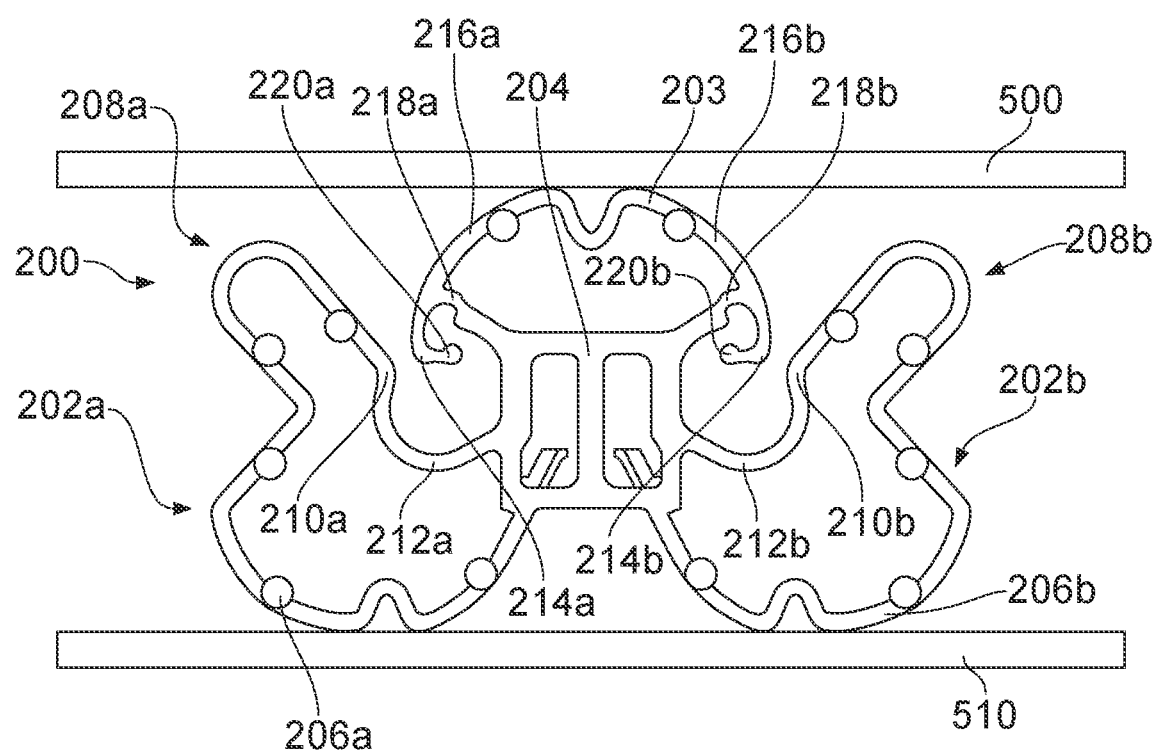
FIG. 4 shows the support clip of FIG. 3 in front view with external contact surfaces provided at the top and bottom of the outer frame.
Figure 5:
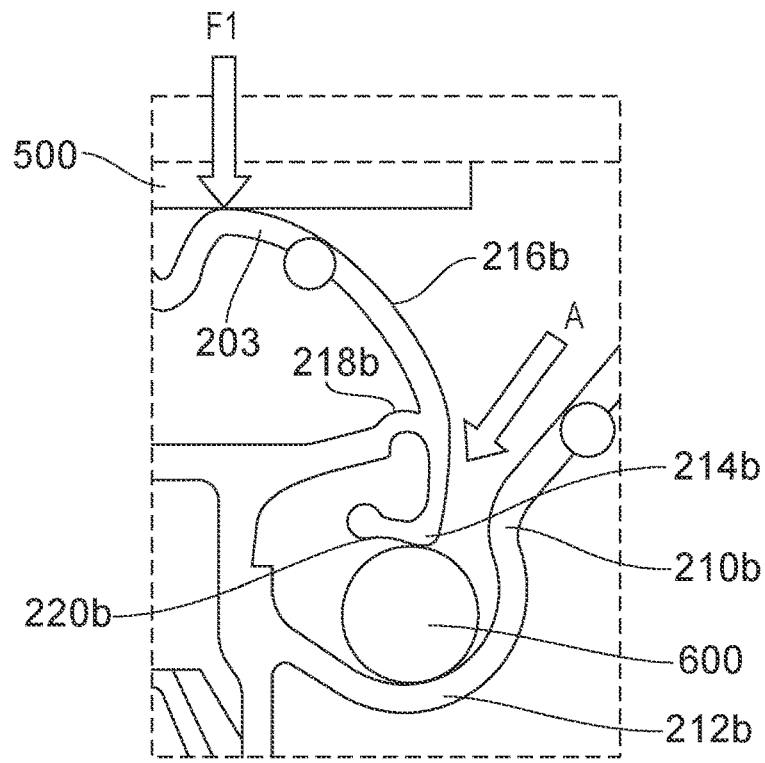
FIG. 5 shows the support clip of FIG. 1 (*a*) in a close-up view of the upper resilient outer frame member and the sleeve member under compression from an upper external surfaces and (b) in a close-up view of a lateral side of the support clip under compression from an upper and lower structure.
Figure 5:
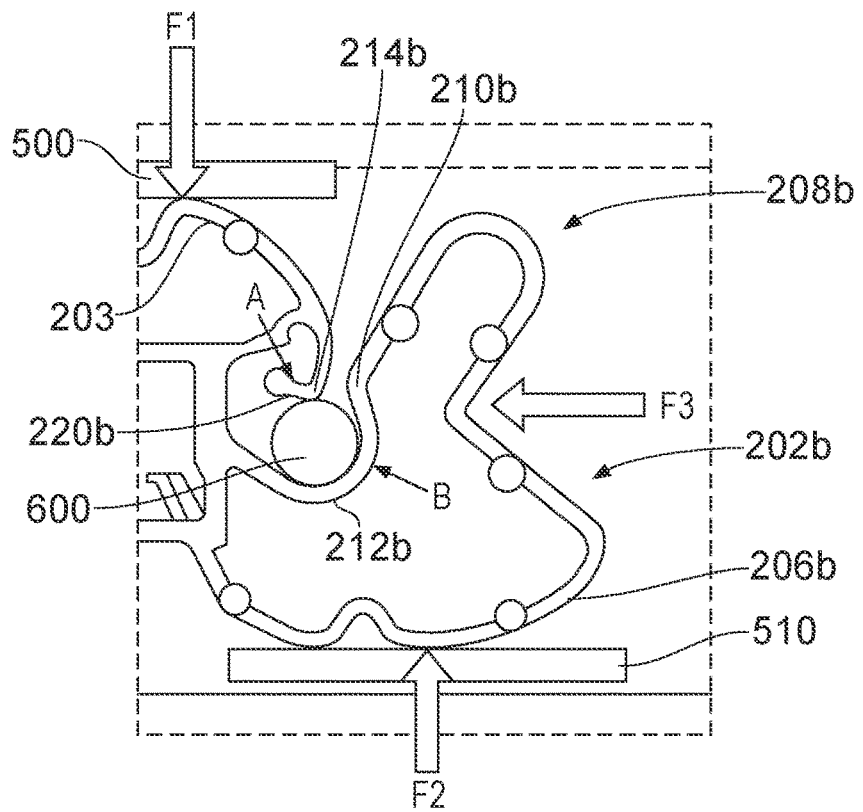

Referring now to FIGS. 4, 5 and 6, a front view of the preferred embodiment of the support clip 200 is shown in situ, i.e. when positioned between two external structures 500, 510 (see FIG. 4), which may be the case when fitted within a vehicle (or any other structure having elongate components, such as, cables, conduits, tubular lines or pipes).

Here, as shown in the close-ups of FIGS. 5 (a) and (b), top and bottom portions of the lower outer frame member 202 and the upper outer frame member 203 engage with the external structures 500, 510. The pressure (F1, F2) provided by the external structures 500, 510 resiliently deforms the support clip 200 biasing the spring element 208a, 208b (as well as a "cornered-in" end portion, i.e. F3, of the resilient lower outer frame member 202) to push the first end portion 210a, 210b of the open-ended sleeve 212a, 212b towards the second end portion 214a, 214b (see arrow 'B'), thus, increasing the clamping pressure provided by the open-ended sleeve 212a, 212b onto the tubular component 600. The angled (i.e. cornered) junction between the end portion of the lateral frame portion 206a, 206b and the spring member 208a, 208b forces the flexure of the open ended sleeve 212a, 212b towards the tubular 600 (see arrow F3).

At the same time, and as particularly illustrated in FIG. 5(a), the pressure (F1) onto the upper outer frame member 203 "levers" the second end portion 214a, 214b about the fulcrum provided by the acuate spring element 218a, 218b so as to press (arrow 'A') the distal lever portion 220a, 220b onto the tubular 600, thus, further increasing the grip pressure in combination with the first end portion 210a, 210b.

So, external forces onto the outer frames 202, 203 (e.g. from collision with external structures 500, 510 during use) are converted into an increased "grip" of the support clip 200 onto its tubular component, therefore, reducing the risk of displacement on or dislodging from the tubular component(s).

In these particular example embodiment 200, the outer upper and lower frame members 202, 203 have a relatively flat cross-sectional profile, though, any other suitable cross-sectional profiles are envisaged.

Moreover, the support clip 200 is injection-moulded from a single material (1K injection moulding), such as, for example, a resilient plastic polymer material. However, it is understood by the person skilled in the art that any other suitable material, or a combination of materials, may be used to create the support clip 200. For example, the support clip 200 may also be made from a metal, such as, spring steel (i.e. leaf spring), or any other suitable resilient composite material.

It will be appreciated by persons skilled in the art that the above embodiment(s) have been described by way of example only and not in any limitative sense, and that various alterations and modifications are possible without departing from the scope of the disclosure as defined by the appended claims. Various modifications to the detailed designs as described above are possible, for example, variations may exist in shape, size, arrangement (i.e. a single unitary components or two separate components), assembly or the like. Therefore, the present method and/or system are not limited to the particular implementations disclosed. Instead, the present method and/or system will include all implementations falling within the scope of the appended claims, both literally and under the doctrine of equivalents.

What is claimed is:

1. A support clip for two or more tubular components, comprising:
    an upper outer frame member coupled to a central support member, adapted to resiliently engage an opposing surface of at least one external structure;
    a lower outer frame member coupled to said central support member opposite said upper outer frame member, having a first and second lateral frame portion arranged laterally opposite each other about said central support member, adapted to resiliently engage an opposing surface of the at least one external structure;
    a first open-ended sleeve member and a second open-ended sleeve member, each one arranged between said upper outer frame member and a respective one of said first and second lateral frame portions and comprising a first end portion, connected to a respective one of said first and second lateral frame portion, and a second end portion, connected to said upper outer frame member, said first end portion is circumferentially spaced apart from said second end portion about a respective one of said first and second open-ended sleeve member;
    a first and second spring member, each one operably coupled between said first end portion of a respective one of said first and second open-ended sleeve member and a respective one of said first and second lateral frame portions, adapted to resiliently urge said first end portion towards said second end portion upon engagement between said first and second lateral portions and the at least one external structure, and wherein said upper outer frame member is adapted to resiliently urge said second end portion of each of said first and second open-ended sleeve members towards said first end portion upon engagement between said upper outer frame member and the at least one external structure, and wherein a distal portion of said second end portion projects towards said central support member at an angle substantially perpendicular to said second end portion.

2. The support clip according to claim 1, wherein said upper outer frame member is configured so as to convey resilient energy, provided from resilient engagement between any portion of said upper outer frame member and the at least one external structure, to said second end portion of at least one of said first and second open-ended sleeve members, so as to resiliently urge said distal portion of said second end portion towards said central support member and apply a retaining force to the at least one of the two or more tubular components.

3. The support clip according to claim 1, wherein said second end portion of each of said first and second open-ended sleeve members forms a fulcrum with said upper outer frame member adapted to permit rotation of said second end portion to resiliently urge said distal end portion towards said central support member.

4. A support clip according to claim 1, wherein each one of said first and second spring members is operably coupling said first end portion of a respective one of said first and second sleeve member with a respective one of said first and second lateral portions.

5. A support clip according to claim 4, wherein each of said first end portions is operably coupled with a respective one of said first and second lateral portions via one of said first spring member or said second spring member.

6. A support clip according to claim 1, wherein each of said first and second spring members is operably integrated within a portion of a respective one of said first and second lateral portions that is coupled to said first end portion of a respective one of said first and second sleeve members.

7. A support clip according to claim 1, wherein said upper outer frame member, said at least one second outer frame member, said central portion, said first and second open-ended sleeve members, and said first and second spring members are integral component parts.

8. A support clip according to claim 7, wherein said upper outer frame member, said at least one second outer frame member, said central portion, said first and second open-ended sleeve members, and said first and second spring members are integrally molded from a resilient material.

9. A support clip according to claim 1, wherein said first spring member and/or said second spring member comprises an arcuate portion.

10. A support clip according to claim 1, wherein said first open-ended sleeve member and said second open-ended sleeve member are arranged in parallel to and spaced apart from one another about said central portion.

11. A support clip according to claim 1, wherein said at least one second outer frame member is configured so as to convey resilient energy, provided from resilient engagement between any portion of said at least one second outer frame member and the at least one external structure, to at least one of said first and second spring members so as to resiliently urge said first end portion of at least one of said first and second open-ended sleeve members towards said second end portion.

12. A support clip according to claim 1, wherein each of said first and second spring members and said upper outer frame member converge towards an opening of a respective one of said first and second sleeve members between said first and second end portions, so as to provide guide for insertion of each of the two or more tubular components.

13. A support clip according to claim 12, wherein an angle between each of said first and second spring members and said upper outer frame member is from 30 degrees to 120 degrees.

14. A support clip according to claim 12, wherein an angle between each of said first and second spring members and said upper outer frame member is from 45 degrees and 90 degrees.

15. A support clip according to claim 12, wherein an angle between each of said first and second spring members and said upper outer frame member is from 60 degrees to 90 degrees.

16. A support clip according to claim 1, wherein at least one of said upper outer frame member and said at least one second outer frame member is continuous.

17. A support clip for two or more tubular components, comprising:
an upper outer frame member coupled to a central support member, adapted to resiliently engage an opposing surface of at least one external structure;
a lower outer frame member coupled to said central support member opposite said upper outer frame member, having a first and second lateral frame portion arranged laterally opposite each other about said central support member, adapted to resiliently engage an opposing surface of the at least one external structure;
a first open-ended sleeve member and a second open-ended sleeve member, each one arranged between said upper outer frame member and a respective one of said first and second lateral frame portions and comprising a first end portion, connected to a respective one of said first and second lateral frame portion, and a second end portion, connected to said upper outer frame member, said first end portion is circumferentially spaced apart from said second end portion about a respective one of said first and second open-ended sleeve member;
a first and second spring member, each one operably coupled between said first end portion of a respective one of said first and second open-ended sleeve member and a respective one of said first and second lateral frame portions, adapted to resiliently urge said first end portion towards said second end portion upon engagement between said first and second lateral portions and the at least one external structure, and
wherein said upper outer frame member is adapted to resiliently urge said second end portion of each of said first and second open-ended sleeve members towards said first end portion upon engagement between said upper outer frame member and the at least one external structure, and
wherein said second end portion of each of said first and second open-ended sleeve members forms a fulcrum with said upper outer frame member adapted to permit rotation of said second end portion to resiliently urge said distal end portion towards said central support member.

18. A support clip according to claim 17, wherein each one of said first and second spring members is operably coupling said first end portion of a respective one of said first and second sleeve member with a respective one of said first and second lateral portions.

19. A support clip according to claim 17, wherein each of said first and second spring members is operably integrated within a portion of a respective one of said first and second lateral portions that is coupled to said first end portion of a respective one of said first and second sleeve members.

20. A support clip according to claim 17, wherein said upper outer frame member, said at least one second outer frame member, said central portion, said first and second open-ended sleeve members, and said first and second spring members are integral component parts.

\* \* \* \* \*